United States Patent [19]

Chen et al.

[11] 4,108,843

[45] Aug. 22, 1978

[54] COPOLYMERS OF POLYPARABANIC ACIDS AND POLYAMIDE-IMIDES

[75] Inventors: Augustin T. Chen, Cheshire; Kemal B. Onder, North Haven, both of Conn.

[73] Assignee: The Upjohn Company, Kalamazoo, Mich.

[21] Appl. No.: 812,918

[22] Filed: Jul. 5, 1977

[51] Int. Cl.² .............................................. C08G 18/00
[52] U.S. Cl. ...................................... 528/74; 528/44; 528/84; 528/68
[58] Field of Search .................. 260/77.5 CH, 77.5 C, 260/77.5 R

[56] References Cited

U.S. PATENT DOCUMENTS

| | | | |
|---|---|---|---|
| 3,591,562 | 7/1971 | Patton | 260/77.5 CH |
| 3,609,113 | 9/1971 | Schade et al. | 260/77.5 CH |
| 3,901,847 | 8/1975 | Johnson et al. | 260/77.5 CH |
| 3,933,758 | 1/1976 | Patton | 260/77.5 CH |
| 3,939,116 | 2/1976 | Johnson et al. | 260/77.5 CH |
| 3,969,290 | 7/1976 | Kraft et al. | 260/77.5 CH |
| 4,005,056 | 1/1977 | Dunwald et al. | 260/77.5 CH |

*Primary Examiner*—M. J. Welsh
*Attorney, Agent, or Firm*—Denis A. Firth; John Kekich

[57] ABSTRACT

Random copolymers of polyparabanic acids and polyamide-imides are described. The copolymers are highly useful engineering thermoplastics which, unlike the corresponding polyparabanic acid homopolymers, are readily moldable by compression molding and like techniques. The copolymers are readily prepared by the one-shot reaction of bis(alkoxyoxalyl)amides of aliphatic, araliphatic or aromatic diamines, with organic diisocyanates and trimellitic anhydride.

9 Claims, No Drawings

COPOLYMERS OF POLYPARABANIC ACIDS AND POLYAMIDE-IMIDES

BACKGROUND OF THE INVENTION

1. Field of the Invention

This invention relates to heterocyclic polymers and to methods for their preparation and is more particularly concerned with copolymers of polyparabanic acid and polyamide-imides and with methods for their preparation.

2. Description of the Prior Art

Polyparabanic acids are known in the art; see, for example, U.S. Pat. Nos. 3,609,113 and 3,661,859. These polymers posses excellent thermal stability but, because of their high melting points, are not susceptible of being molded by conventional techniques such as compression molding, extrusion and the like. Accordingly, their use has been limited hitherto to formation of films by casting from solution and to incorporation in coating compositions for wire coating and like applications.

Certain copolymers of polyparabanic acids with other polymers have been described. German Offenlegungsschrift No. 2,404,741 shows the preparation of copolymers which contain parabanic acid and hydantoin moieties. However, these copolymers possess melt characteristics of the same order as the polyparabanic acid homopolymers themselves and are not capable of being molded by conventional techniques other than casting from solutions.

German Offenlegungsschrift No. 2,450,035 shows the preparation of copolymers of parabanic acid and imides but, again, the melt characteristics are such that molding by conventional techniques is not possible.

We have now found that certain copolymers which contain the parabanic acid moiety posses excellent melt characteristics which permit the copolymers to be molded by compression molding techniques and the like. These copolymers also possess the excellent thermal stability and structural strength properties of the polyparabanic acid homopolymers themselves.

SUMMARY OF THE INVENTION

This invention comprises copolymers characterized by the presence in random arrangement of each of the following recurring units:

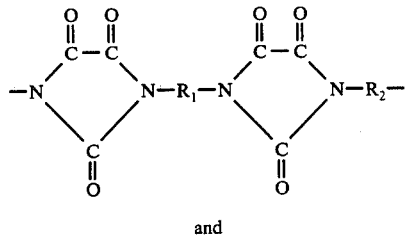

and

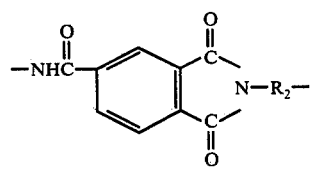

wherein $R_1$ represents a member selected from the group consisting of alkylene from 1 to 15 carbon atoms, inclusive, arylene from 6 to 12 carbon atoms, inclusive, and aralkylene from 7 to 25 carbon atoms, inclusive, and $R_2$ is the residue of an organic diisocyanate $R_2(NCO)_2$.

The invention also comprises processes for the preparation of the above-described copolymers.

The term "alkylene from 1 to 15 carbon atoms, inclusive" means both straight and branched-chain alkylene having the stated carbon atom content. Illustrative of alkylene are methylene, ethylene, 1,2-propylene, 1,3-propylene, 1,4-butylene, 1,6-hexylene, 2-methyl-1,6-hexylene, 2,2,4-trimethylhexylene, 2,4,4-trimethylhexylene, 3 methylene-3,5,5-trimethylcyclohexylene

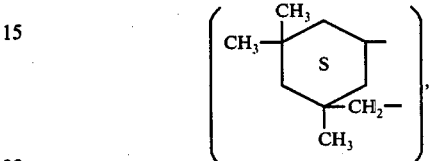

2,2'-propane-bis(4-cyclohexylene)

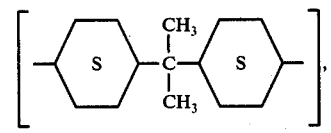

4,4'-methylene-bis(cyclohexylene), and the like.

The term "arylene from 6 to 12 carbon atoms, inclusive" means the divalent radical obtained by removing two nuclear hydrogen atoms from an aromatic hydrocarbon having the stated carbon atom content. Illustrative of arylene are phenylene, naphthylene, biphenylene and the like.

The term "aralkylene from 7 to 25 carbon atoms, inclusive," means the divalent radical obtained by removing two hydrogen atoms from an alkyl-substituted aromatic hydrocarbon of the stated carbon atom content. Illustrative of aralkylene are tolylene, xylylene, phenylenemethylene

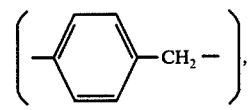

bis(phenylene)methylene

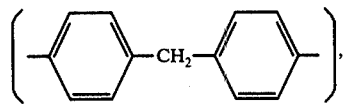

2-naphthylenemethylene

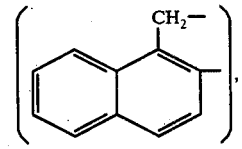

2,2'-propanebis(4-phenylene)

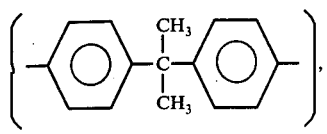

dicyclohexyldi(4-phenylene)methane

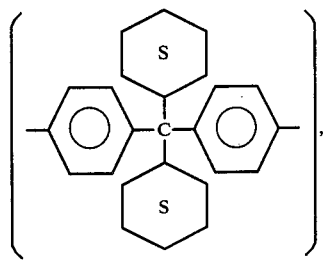

and the like.

DETAILED DESCRIPTION OF THE INVENTION

The copolymers of the invention are prepared by bringing together, in a one-shot reaction, the appropriate dissocyanate $R_2(NCO)_2$, trimellitic anhydride, and the appropriate bis(alkoxyoxalyl)amide of the formula:

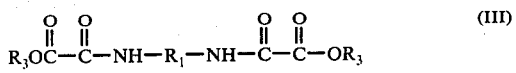

wherein $R_1$ is as above defined and $R_3$ represents lower-alkyl, i.e. alkyl from 1 to 6 carbon atoms, inclusive, such as methyl, ethyl, propyl, butyl, pentyl, hexyl and isomeric forms thereof.

The reactants are brought together, advantageously in the presence of an inert polar organic solvent, and heated at a temperature in the range of about 150° C to about 250° C. The progress of the reaction can be followed by routine analytical procedures, for example, aliquots of the reaction mixture are removed at appropriate intervals and subjected to infrared analysis to determine the point at which the absorption bands characteristic of the isocyanate group have disappeared. When the reaction is adjudged complete by such methods, the desired copolymer is isolated from the reaction product by conventional procedures. For example, the total reaction product is poured into water or like fluids in which the copolymer is insoluble. The precipitated polymer is then comminuted, washed with solvent in which the starting monomers are soluble, and dried.

The proportions in which the diamide (III), the diisocyanate, and the trimellitic anhydride are employed can vary over a wide range provided that the ratio of moles of the diisocyanate to the sum of the moles of diamide and trimellitic anhydride employed in the reaction is substantially unity. Subject to this proviso, the molar proportion of diamide (V) to trimellitic anhydride can vary within the range of about 4:1 to about 0.25:1. This proportion will, of course, affect the proportion of parabanic acid units (I) to amide-imide units (II) in the resulting copolymer.

The reactions which take place in the above described copolymerization are:

(i) the formation of parabanic acid units (I) by reaction between the diisocyanate and the diamide:

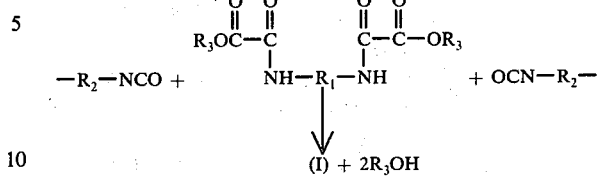

and (ii) the formation of polyamide-imide units (II) by reaction between the diisocyanate and trimellitic anhydride:

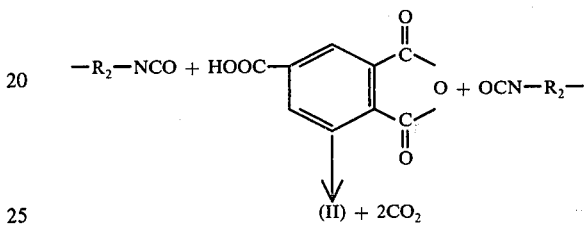

The above reactions are advantageously catalyzed by inclusion in the reaction mixture of a catalyst for the amide-imide formation. Any of the catalysts known in the art for this purpose can be employed such as the alkali metal alkoxides (as described in U.S. Pat. No. 4,001,186), the N-alkali metal lactamates (as described in U.S. Pat. No. 4,021,412), the phospholene-1-oxides or 1-sulfides (described in U.S. Pat. Nos. 2,663,737–8) and the phospholane-1-oxides or 1-sulfides (described in U.S. Pat. No. 2,663,739). A particularly preferred group of catalysts comprises 1,3-dimethyl-2-phospholene-1-oxide, 1,3-dimethyl-3-phospholene-1-oxide and mixtures of these two isomers.

The above catalysts are generally employed in amounts corresponding to about 0.001 percent to about 0.5 percent by weight of total reactants and preferably in amounts corresponding to about 0.02 percent to about 0.2 percent by weight of total reactants.

By "inert polar organic solvent" is meant any of the polar organic solvents known in the art which do not enter into reaction with one or more of the reactants or interfere in any other way with the desired course of the process of the invention. Illustrative of inert polar organic solvents are N-methylpyrrolidone, dimethylformamide, dimethylacetamide, dimethylsulfoxide, hexamethylphosphoramide, dimethylsulfone, tetramethylenesulfone, diphenylsulfone, and the like.

The diamides (III) which are employed as starting materials for the copolymers of the invention are readily obtained by heating the appropriate diamine $H_2N—R_1—NH_2$, where $R_1$ is as hereinbefore defined, with an excess of the appropriate dialkyl oxalate under the conditions described by Klinger, Annalen, 184, p. 263, 1877.

Illustrative of the diamines which are employed as starting materials for the diamides (V) are 4,4'-methylenebis(aniline), 4,4'-methylenebis(cyclohexylamine), hexamethylenediamine, octamethylenediamine, butylenediamine, ethylenediamine, 1,12-dodecandiamine, 1,4-phenylenediamine, 4,4'-biphenylenediamine, 2,4-toluenediamine, 2,6-toluenediamine, and the like.

The organic diisocyanates employed in preparing the copolymers of the invention can be any of those known in the art. Illustrative of organic diisocyanates are 2,4-toluene diisocyanate, 2,6-toluene diisocyanate, 4,4'-methylenebis(phenyl isocyanate), 2,4'-methylenebis(phenyl isocyanate), dianisidine diisocyanate, tolidine diisocyanate, hexamethylene diisocyanate, m-xylylene diisocyanate, 1,5-naphthalene diisocyanate, p-phenylene diisocyanate, 1,4-diethylbenzene-β,β'-diisocyanate, di(p-isocyanatocyclohexyl-methane, and the like. Mixtures of two or more such diisocyanates can be employed if desired.

The polymers obtained in accordance with the invention are random copolymers characterized by the presence of each of the recurring units (I) and (II) is random order. In contrast to the corresponding polyparabanic acid homopolymers, which have too high a melting point to be molded satisfactorily by conventional techniques, the copolymers of the invention possess good melt characteristics and can be molded by compression molding. The copolymers of the invention are engineering plastics which can be molded and used in the form of such articles as bearings, seals, fibers, gaskets and the like.

The following examples describe the manner and process of making and using the invention and set forth the best mode contemplated by the inventors of carrying out the invention but are not to be construed as limiting.

in the form of white needles having a melting point of 146°–147° C.

B. A mixture of 11.94 g. (0.03 mole) of diethyl 4,4'-methylenedioxanilate (prepared as described in Part A above) and 5.76 g. (0.03 mole) of trimellitic acid anhydride was dissolved in 40 ml. of anhydrous tetramethylenesulfone. The solution so obtained was heated to 200° C with stirring under an atmosphere of nitrogen. To this solution was added 0.2 g. of 1,3-dimethylphospholene-1-oxide followed, dropwise, by a solution of 15 g. (0.06 mole) of 4,4'-methylenebis(phenyl isocyanate) in 50 ml. of anhydrous tetramethylenesulfone. The solution became quite viscous and, after 90% of the diisocyanate mixture had been added, 50 ml. of anhydrous tetramethylenesulfone was added to dilute the solution before adding the remainder of the diisocyanate. The addition of the latter was complete in three hours and the resulting mixture was heated at the same temperature for another two hours before being cooled and poured into an excess of cold water. The yellow polymer material which separated was chopped under water, isolated by decantation, and washed by soaking in methanol for six hours. The washed product was isolated by filtration and dried in a vacuum oven for 16 hours. The resulting poly(parabanic acid-amide-imide) was found to have an intrinsic viscosity (0.5% w/w in dimethylformamide) of 0.73 and was characterized by approximately equimolar proportions of recurring units of the formula

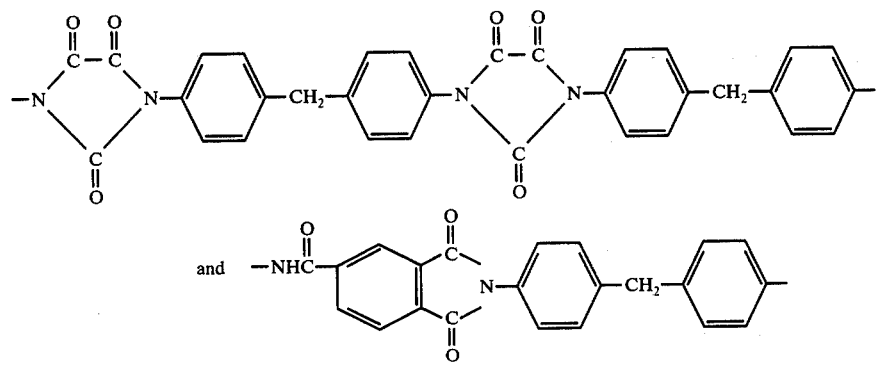

EXAMPLE 1

Diethyl 4,4'-methylenedioxanilate

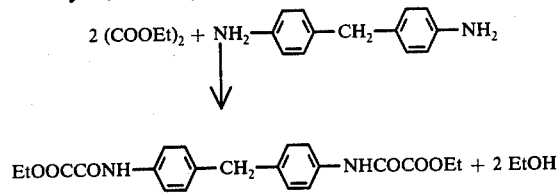

A mixture of 118.8 g. (0.6 mole) of 4,4'-diaminophenylmethane and 600 g. (4.11 mole) of diethyl oxalate was heated at 150° C with stirring under an atmosphere of nitrogen. Ethanol distilled out of the reaction mixture until, at the end of 6 hours' heating, the theoretical quantity of ethanol had been collected. At this time the reaction mixture was cooled to circa 20° C and the solid which separated was isolated by filtration, washed with cold ethanol and dried in vacuo at 100° C for seven hours. The solid so obtained was recrystallized from 95% ethanol to yield diethyl 4,4'-methylenedioxanilate A sample of the polymer was compression molded at 310° C and 4000 psi pressure to give a brown opaque sheet. A sample of the sheet was subjected to a Gehman Torsional Stiffness Test and found to have a glass transition temperature (Tg) of 285° C. The following physical properties were determined from samples taken from the molded sheet.

| Density: | 1.28 | g/cc. |
|---|---|---|
| Tensile Strength: | 9540 | psi |
| Modulus: | 253,100 | psi |
| Elongation: | 5.4% | |

EXAMPLE 2

A mixture of 11.94 g. (0.03 mole) of diethyl 4,4'-methylenedioxanilate, 5.76 g. (0.03 mole) of trimellitic anhydride, and 0.05 g. of benzoic acid was dissolved in 50 ml. of anhydrous tetramethylene sulfone. The resulting solution was heated to 200° C under nitrogen and 0.12 g. of 1,3-dimethylpholene-b 1-oxide was added followed, dropwise with stirring, by a solution of 3.65 g. (0.02 mole) of 2,4-toluene diisocyanate and 9.75 g.

(0.039 mole) of 4,4'-methylenebis(phenyl isocyanate) in 50 ml. of tetramethylene sulfone. The addition was complete in approximately 3 hours. After about ¾ of the isocyanate solution had been added, 50 ml. of anhydrous tetramethylene sulfone was added to reduce the viscosity of the reaction mixture. When the addition of isocyanate was complete, the reaction mixture was maintained at 200° C for a further 3 hours before being cooled and poured into water. The precipitated polymer was then chopped into small pieces, washed by soaking in methanol for 6 hours and then isolated by filtration and dried in a vacuum oven for 16 hours. The resulting poly(parabanic acid-amide-imide) was found to have an intrinsic viscosity (0.5% w/w in N-methylpyrrolidone) of 0.57 and was characterized by approximately equimolar proportions of recurring units of the formula:

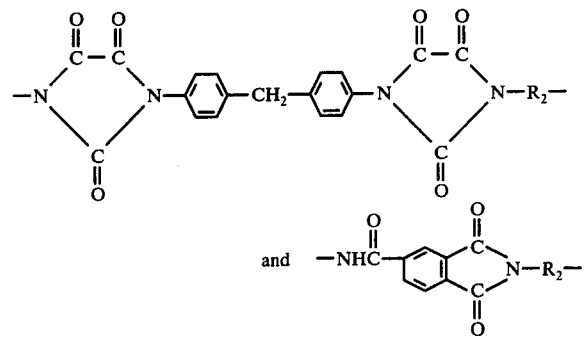

wherein approximately 40 percent of the R₂ groups are

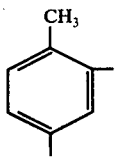

and the remainder are

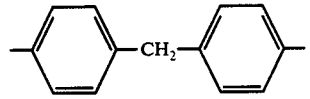

The powder was compression molded readily at 295° C and 4000 psi to give a brown opaque sheet. A sample, when subjected to the Gehman Torsional Stiffness Test, was found to have a glass transition temperature (Tg) of 238° C. This behaviour is indicative of the capability of injection molding of the product.

EXAMPLE 3

Using the procedure described in Example 1, but replacing the diethyl 4,4'-methylenedioxanilate there used by an equivalent amount of N,N'-di(ethoxyoxalyl)-hexamethylenediamine (prepared from diethyloxalate and hexamethylenediamine using the procedure of Example 1, part A) there is obtained the corresponding poly(parabanic acid-amide-imide) characterized by approximately equimolar proportions of recurring units of the formula:

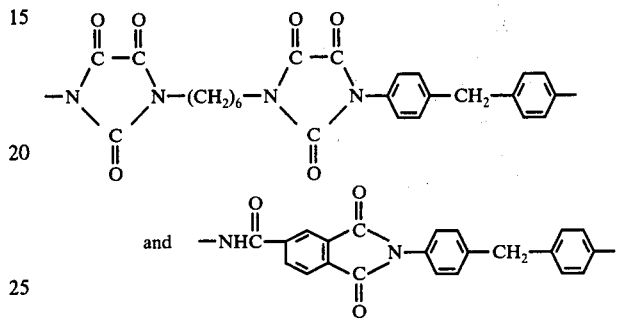

Similarly, using the procedure described in Example 1, but replacing the diethyl 4,4'-methylenedioxanilate there used by an equivalent amount of N,N'-di(ethoxyoxalyl)-1,4-phenylenediamine, N,N'-di(ethoxyoxalyl)-4,4'-biphenylenediamine or N,N'-di(ethoxyoxalyl)-1,10-decanediamine, there are obtained the corresponding poly(parabanic acid-amide-imide) having approximately equimolar proportions of the recurring units of formulae (I) and (II) wherein R₁ is 1,4-phenylene, 4,4'-biphenylene and 1,10-decamethylene, respectively, and R₂ is

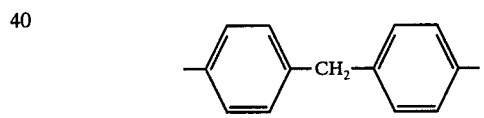

in each case.

EXAMPLE 4

Using the procedure described in Example 1, but replacing the 4,4'-methylenebis(phenyl isocyanate) there used by an equivalent amount of 4,4'-methylenebis(cyclohexyl isocyanate), there is obtained a poly(parabanic acid-amide-imide) characterized by approximately equimolar proportions of recurring units of the formula:

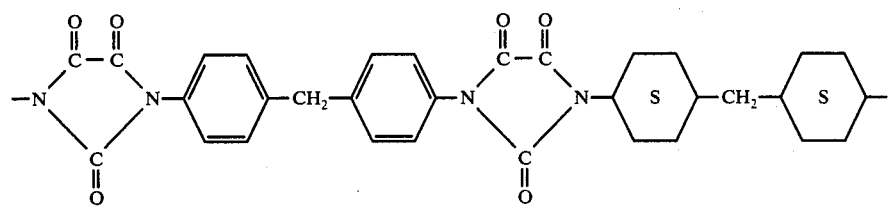

and 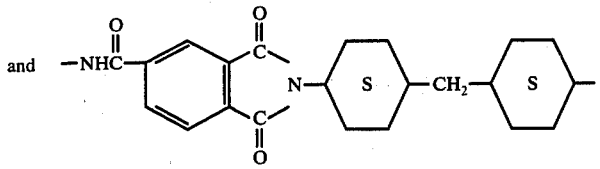

10

EXAMPLE 5

Using the procedure described in Example 1, but replacing the diethyl 4,4'-methylenedioxanilate there used by an equivalent amount of N,N'-di(ethoxyoxalyl) 4,4'-methylenebis(cyclohexylamine), there is obtained the corresponding poly(parabanic acid-amide-imide) having approximately equimolar proportions of the recurring units of formulae (I) and (II) wherein $R_1$ is

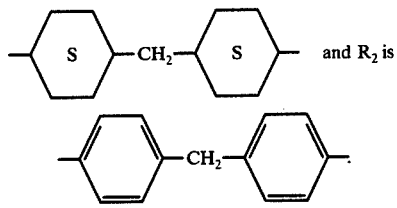 and $R_2$ is

We claim:

1. A copolymer characterized by the presence in random arrangement of each of the following recurring units:

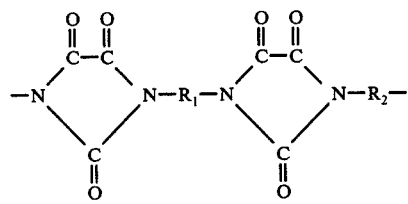

and

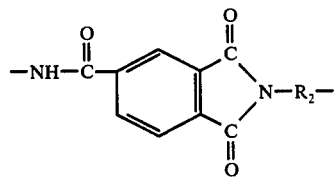

wherein $R_1$ represents a member selected from the group consisting of alkylene from 1 to 15 carbon atoms, inclusive, arylene from 6 to 12 carbon atoms, inclusive, and aralkylene from 7 to 25 carbon atoms, inclusive, and $R_2$ is the residue of an organic diisocyanate $R_2(NCO)_2$ the relative proportions of the numbers of each of the recurring units in the molecule being within the range of 4:1 to 1:4.

2. A copolymer according to claim 1 wherein $R_1$ and $R_2$ each represent

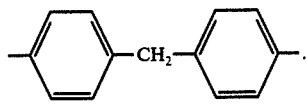

3. A copolymer according to claim 1 wherein a portion of the groups $R_2$ represent a member selected from

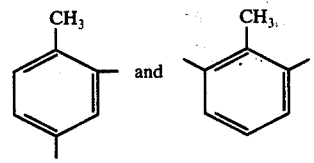

and the remainder of said groups $R_2$ represent

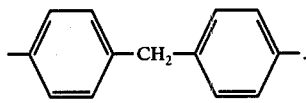

4. A copolymer according to claim 3 wherein 40 percent of the $R_2$ groups are

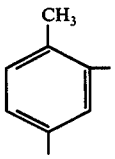

and the remainder of the $R_2$ groups are

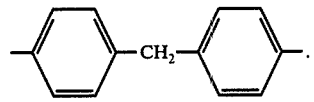

and $R_1$ represents

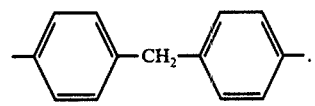

5. A copolymer according to claim 1 wherein the group $R_1$ is selected from $-(CH_2)_6-$ and $-(CH_2)_{10}-$.

6. A copolymer according to claim 1 wherein the group $R_1$ is

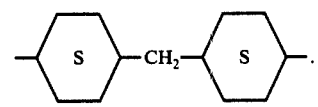

7. A copolymer according to claim 1 wherein the group $R_1$ is

8. A copolymer according to claim 1 wherein the group $R_1$ is
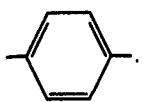
9. A copolymer characterized by the presence in random arrangement of each of the following recurring units:
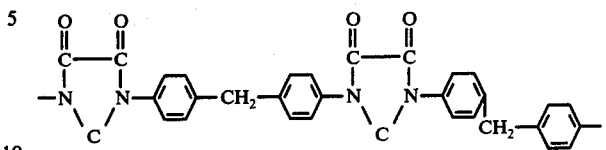
and 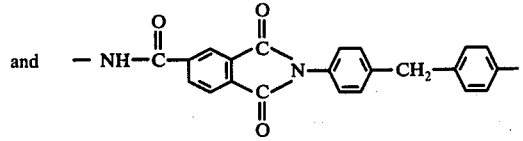
the relative proportions of the numbers of each of the recurring units in the molecule being within the range of 4:1 to 1:4.
* * * * *

UNITED STATES PATENT OFFICE
CERTIFICATE OF CORRECTION

Patent No. 4,108,843  Dated August 22, 1978

Inventor(s) Augustin T. Chen and Kemal B. Onder

It is certified that error appears in the above-identified patent and that said Letters Patent are hereby corrected as shown below:

| | |
|---|---|
| Column 1, line 59: | Should read: |
| (III) | (II) |
| Column 5, line 15: | Should read: |
| is random | in random |
| Column 6, line 66: | Should read: |
| -bl-oxide | -1-oxide |

Column 12, claim 9, lines 5-10
The portion of the formula
which reads:                           Should read:

Signed and Sealed this

Twentieth Day of March 1979

[SEAL]

Attest:

RUTH C. MASON
Attesting Officer

DONALD W. BANNER
Commissioner of Patents and Trademarks